United States Patent
Sawano et al.

(10) Patent No.: US 6,414,721 B1
(45) Date of Patent: Jul. 2, 2002

(54) VIDEO SIGNAL DIGITAL PROCESSING DEVICE, INFORMATION STORAGE MEDIUM FOR VIDEO SIGNAL DIGITAL PROCESSING, AND VIDEO SIGNAL DIGITAL PROCESSING METHOD

(75) Inventors: Takao Sawano; Takuya Kuribayashi; Hideaki Shimizu; Hirohito Yoshimoto, all of Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 09/188,360

(22) Filed: Nov. 10, 1998

(30) Foreign Application Priority Data

Nov. 20, 1997 (JP) .............................. 9-337653

(51) Int. Cl.[7] .............................................. H04N 5/44
(52) U.S. Cl. ........................................................ 348/559
(58) Field of Search .............................. 348/559, 560, 348/571, 572, 573, 575, 663, 664, 714, 715, 717, 578; H04N 5/44

(56) References Cited

U.S. PATENT DOCUMENTS

| | | | | |
|---|---|---|---|---|
| 4,048,650 A | * | 9/1977 | Tanaka et al. | 348/559 |
| 4,701,785 A | * | 10/1987 | Willis | 348/560 |
| 4,858,930 A | | 8/1989 | Sato | |
| 5,012,328 A | * | 4/1991 | Ishiguro | 348/560 |
| 5,018,014 A | * | 5/1991 | Hashimoto | 348/560 |
| 5,121,476 A | * | 6/1992 | Yee | 348/559 |
| 5,150,200 A | * | 9/1992 | Hong | 348/553 |
| 5,191,645 A | | 3/1993 | Carlucci et al. | |
| 5,237,648 A | | 8/1993 | Mills et al. | |
| 5,452,022 A | * | 9/1995 | Yamamoto et al. | 348/14.14 |
| 5,552,799 A | | 9/1996 | Hashiguchi | |
| 6,219,106 B1 | * | 4/2001 | Sato | 348/523 |

FOREIGN PATENT DOCUMENTS

| | | |
|---|---|---|
| EP | 0 431 723 | 6/1991 |
| EP | 0 780 771 | 6/1997 |
| GB | 2130842 | 6/1984 |
| GB | 2323738 | 9/1998 |

OTHER PUBLICATIONS

Simpson, Alan, "Mastering WorldPerfect 6.1 for Windows Special Edition Second Edition", SYBEX, 1995, pp. 16–18, 647 and 1132–1133.

* cited by examiner

Primary Examiner—Michael H. Lee
(74) Attorney, Agent, or Firm—Nixon & Vanderhye P.C.

(57) ABSTRACT

An inputted analog color video signal is converted into a digital video signal by an analog-to-digital converting circuit 13, is then written into a transfer buffer 15, and is digitally processed. That is, with respect to a moving picture which is changed for each frame, black-and-white image data is extracted from the digital video signal stored in the transfer buffer 15, is temporarily stored in a WT buffer memory 21, and is displayed on a CRT. With respect to a still picture whose acceptance is designated at suitable timing while seeing the moving picture, color image data is extracted from the digital video signal stored in the transfer buffer 15, is temporarily stored in a CT buffer memory 28, and is displayed on the CRT.

6 Claims, 8 Drawing Sheets

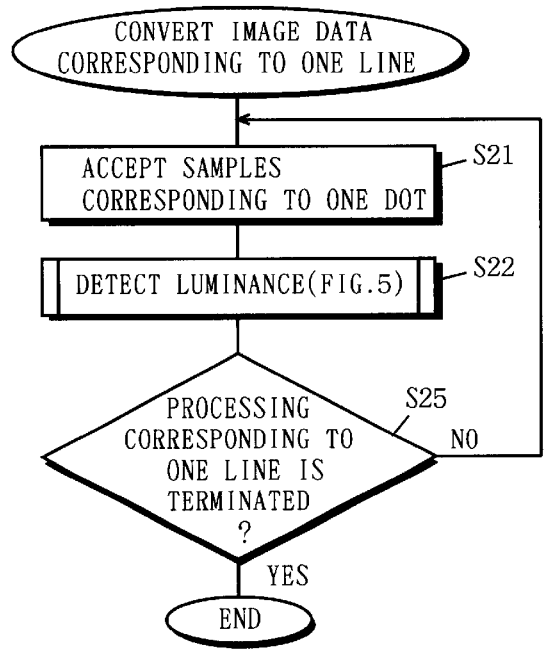
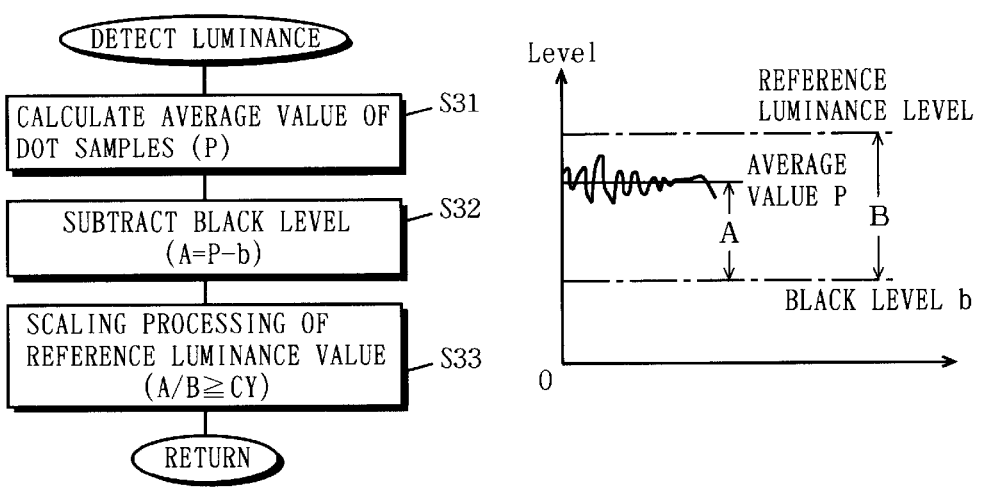

FIG. 10
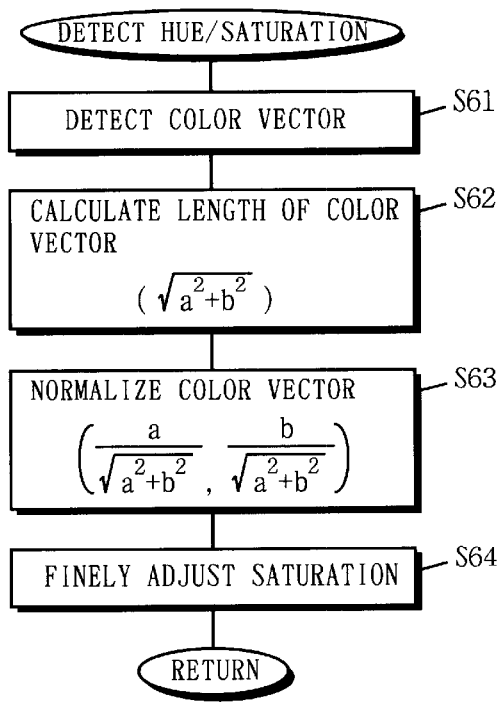
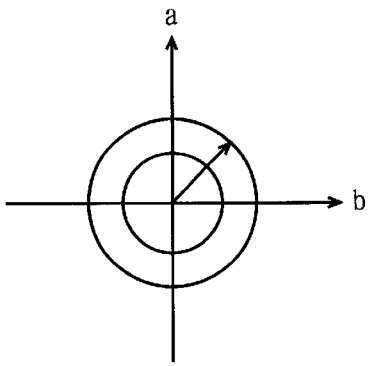
$$a = \sum_{i=0}^{SMR} Sample[j] \cdot Burst[i]$$
$$b = \sum_{i=0}^{SMR} Sample[i] \cdot Burst[i+SMR/4]$$
(SMR=NUMBER OF DOT SAMPLES)

VIDEO SIGNAL DIGITAL PROCESSING DEVICE, INFORMATION STORAGE MEDIUM FOR VIDEO SIGNAL DIGITAL PROCESSING, AND VIDEO SIGNAL DIGITAL PROCESSING METHOD

BACKGROUND OF THE INVENTION

1. Field of the Invention

The present invention relates generally to a video signal digital processing device, an information storage medium for video signal digital processing, and a video signal digital processing method, and more specifically, to an apparatus, an information storage medium and a method for performing image processing using image data obtained by digitally processing a color video signal and accepting the digitally processed color video signal in simple construction or the simple procedure for processing.

2. Description of the Background Art

As a video signal digital processing device for digitally accepting a color video signal to perform storage processing, a circuit as shown in FIG. 11 has been conventionally known. The video signal digital processing device comprises a synchronous separating circuit 1, a sub-carrier generating circuit 2, a luminance/chroma separating circuit 3, a phase shifting circuit 4, color difference demodulating circuits 5r, 5g, and 5b, adding circuits 6r, 6g, and 6b, analog-to-digital (A/D) converters 7r, 7g, and 7b for respectively making analog-to-digital (A/D) conversion for R, G, and B signals representing the three primary colors, i.e., red (R), green (G), and blue (B), and an image processing system 8 containing an image memory.

The synchronous separating circuit 1 separates, when a color video signal (a so-called composite signal or composite video signal) is fed thereto, the color video signal into three signals, i.e., a composite synchronizing signal, a burst flag (included in a color burst signal), and a luminance/chroma (Y/C) signal, and directly feeds the composite synchronizing signal to the image processing system 8, feeds the burst flag to the sub-carrier generating circuit, and feeds the luminance/chroma signal to the luminance/chroma separating circuit 3. The luminance/chroma separating circuit 3 feeds a chroma signal (C) to the color difference demodulating circuits 5r, 5g, and 5b, and feeds a luminance (Y) signal to the adding circuits 6r, 6g, and 6b. The sub-carrier generating circuit generates a sub-carrier signal (i.e., a burst phase signal) on the basis of the burst flag, and feeds the sub-carrier signal to the phase shifting circuit 4. The phase shifting circuit 4 feeds, on the basis of the burst phase signal, a phase signal which is delayed by 90 degrees from the color burst signal to the color difference demodulating circuit 5r, feeds a phase signal which is delayed by 235.8 degrees from the color burst signal to the color difference demodulating circuit 5g, and further feeds a phase signal which is delayed by 180 degrees from the color burst signal to the color difference demodulating circuit 5b. The color difference demodulating circuits 5r, 5g, and 5b respectively generate color difference signals R-Y, G-Y, and B-Y on the basis of the C signal and the phase shifting signal, and feed the signals to the corresponding adding circuits 6r, 6g, and 6b. The adding circuits 6r, 6g, and 6b respectively add the luminance (Y) signal to the color difference signals R-Y, G-Y, and B-Y, to generate the R signal, the G signal, and the B signal, and feed the signals to the corresponding A/D converters 7r, 7g, and 7b. The A/D converters 7r, 7g, and 7b respectively make A/D conversion for the R signal, the G signal, and the B signal, to generate digital values (color data) corresponding to the color signals, feed the digital values to the image processing system 8, and respectively store the digital values in the image memory (or a frame buffer memory) contained in the image processing system 8 for the R signal, the G signal, and the B signal.

In the prior art shown in FIG. 11, the luminance/chroma separating circuit 3, the phase shifting circuit 4, the color difference demodulating circuits 5r, 5g, and 5b are respectively constituted by analog circuits, and three series of A/D converters 7r, 7g, and 7b are provided, so that the circuit arrangement of the video signal digital processing device becomes significantly complicated, and the cost thereof is high. Therefore, the conventional video signal digital processing device cannot be sold at a price which can spread in general homes so that it is rather suitable for a so-called maniac. An analog circuit portion cannot be digitally processed, so that program (or software) processing is difficult to perform.

SUMMARY OF THE INVENTION

Therefore, an object of the present invention is to provide a video signal digital processing device, an information storage medium for video signal digital processing, and a video signal digital processing method, in which a color video signal can be accepted after being converted into a data format which is easy to digitally process in simple and low-cost construction.

The present invention has the following features in order to attain the above-mentioned object.

A first aspect of the present invention is directed to a video signal digital processing device for digitally processing an analog color video signal and feeding the digitally processed analog color video signal to a display device, which comprises:

an analog-to-digital conversion portion for converting the analog color video signal into a digital video signal;

a first temporary storage portion for storing digital values of a luminance signal corresponding to a plurality of pixels composing one screen;

a second temporary storage portion for storing digital values of color data representing three primary colors corresponding to the plurality of pixels composing one screen;

a luminance data extraction portion for extracting the digital values of the luminance signal from the digital video signal while the analog color video signal is a signal for a moving picture which is changed for each frame;

a read timing designation portion for designating timing at which the color data should be read from the digital video signal; a color data extraction portion for extracting for each color the digital values of the color data representing the three primary colors from the digital video signal at the timing designated by the read timing designation portion;

a write control portion for writing in a sequential order of frame scanning the digital values of the luminance signal for each frame which have been extracted by the luminance data extraction portion into the first temporary storage portion until the read timing is designated by the read timing designation portion, and writing the digital values of the color data which have been extracted for each color by the color data extraction portion into the second temporary storage portion when the read timing is designated by the read timing designation portion; and a read control portion for sequentially reading out the digital values of the luminance signal for each frame which are stored in the first temporary storage portion and feeding the digital values to the display device, to display the moving picture corresponding to the analog color video signal in black and white, and sequentially reading out the digital values of the color data for each color in a frame which are stored in the second temporary storage portion and feeding the digital values to the display device, to display a still picture corresponding to the frame of the analog color video signal in colors.

As described in the foregoing, according to the first aspect, the analog color video signal is converted into the digital video signal, after which processing for accepting an image is digitally performed. Therefore, the circuit arrangement of the video signal digital processing device can be simplified, and the cost thereof can be reduced, as compared with a case where analog processing is performed as in the prior art. A part of digital processing can be easily replaced with program processing. Further, in the first aspect, the moving picture for reference is displayed in black and white, so that the amount of data to be processed can be significantly reduced, as compared with a case where it is displayed in colors. As a result, when processing in the part is realized by hard circuits, the scale of processing circuits can be simplified. Alternatively, when processing in the part is realized by software processing, the number of processing steps can be reduced, and the load on a CPU can be reduced.

A second aspect is an aspect dependent on the first aspect, which further comprises an input buffer memory for temporarily storing the digital values of the digital video signal, wherein the luminance data extraction portion extracts the digital values of the luminance signal out of the digital values stored in the input buffer memory, and the color data extraction portion extracts for each color the digital values of the color data representing the three primary colors out of the digital values stored in the input buffer memory.

A third aspect is an aspect dependent on the first aspect, wherein the read control portion sequentially reads out the digital values of the luminance signal for each frame which are stored in the first temporary storage portion to display the moving picture in black and white on a part of a display screen of the display portion, and sequentially reads out the digital values of the color data for each color in a frame which are stored in the second temporary storage portion to display the still picture in colors on the other part of the display screen of the display device.

As described in the foregoing, according to the third aspect, a black-and-white moving picture and a color still picture can be simultaneously displayed on the same screen.

A fourth aspect is an aspect dependent on the first aspect, wherein the read control portion performs in a time divisional manner a first read controlling operation for sequentially reading out the digital values of the luminance signal for each frame which are stored in the first temporary storage portion to display the moving picture in black and white on the display device and a second read controlling operation for sequentially reading out the digital values of the color data for each color in a frame which are stored in the second temporary storage portion to display the still picture in colors on the display device.

As described in the foregoing, according to the fourth aspect, a black-and-white moving picture and a color still picture can be displayed in a time divisional manner at different timings.

A fifth aspect is directed to an information storage medium, which is applied to a video signal digital processing device comprising an analog-to-digital conversion portion for converting an analog color video signal into a digital video signal, a first temporary storage portion for storing digital values of a luminance signal corresponding to a plurality of pixels composing one screen, a second temporary storage portion for storing a digital value of color data representing three primary colors corresponding to the plurality of pixels composing one screen, and an information processing portion and for digitally processing the color video signal and feeding the digitally processed color video signal to a display device, the information storage medium storing a program executed by the information processing portion, wherein the program comprises:

a luminance data extraction program for extracting the digital values of the luminance signal from the digital video signal while the analog color video signal is a moving picture which is changed for each frame;

a read timing designation program for designating timing at which the color data should be read from the digital video signal; a color data extraction program for extracting for each color the digital values of the color data representing the three primary colors from the digital video signal at the read timing designated by the read timing designation program;

a first write program for writing in a sequential order of frame scanning the digital values of the luminance signal for each frame which have been extracted by processing based on the luminance data extraction program into the first temporary storage portion until the reading of the color data is designated by the read timing designation program;

a second write program for writing the digital values of the color data which have been extracted for each color by processing based on the color data extraction program into the second temporary storage portion when the read timing is designated by the read timing designation program;

a first read program for sequentially reading out the digital values of the luminance signal for each frame which are stored in the first temporary storage portion and feeding the digital values to the display device, to display the moving picture corresponding to the analog color video signal in black and white; and a second read program for sequentially reading out the digital values of the color data for each color in a frame which are stored in the second temporary storage portion and feeding the digital values to the display portion, to display a still picture corresponding to the analog color video signal in colors.

A sixth aspect is directed to a video signal digital processing method of digitally processing a color video signal and feeding the digitally processed color video signal to a display device to display the color video signal thereon in a video signal digital processing device comprising an analog-to-digital conversion portion for converting an analog color video signal into a digital video signal, a first temporary storage portion for storing digital values of luminance signals corresponding to a plurality of pixels composing one screen, a second temporary storage portion for storing a digital value of color data representing three primary colors corresponding to the plurality of pixels composing one screen, and an information processing portion, which comprises:

the conversion step of converting the analog color video signal into a digital video signal by the analog-to-digital conversion portion;

the luminance-signal extraction step of extracting the digital values of the luminance signals from the digital video signal obtained by the conversion at the conversion step while the analog color video signal is a moving picture which is changed for each frame;

the timing-designation step of designating timing at which the color data should be read from the digital video signal; the color-data-extraction step of extracting for each color the digital values of the color data representing the three primary colors from the digital video signal at the timing designated at the timing-designation step;

the luminance-signal-writing step of writing in a sequential order of frame scanning the digital values of the luminance signals for each frame which have been extracted at the luminance-signal-extraction step into the first temporary storage portion until the reading of the color data is designated at the timing-designation step;

the color-data-writing step of writing the digital values of the color data which have been extracted for each color at the color-data-extraction step into the second temporary storage portion when the read timing is designated at the timing-designation step;

the moving-picture-displaying step of sequentially reading out the digital values of the luminance signals for each frame which are stored in the first temporary storage portion and feeding the digital values to the display portion, to display the moving picture corresponding to the analog color video signal in black and white; and the still-picture-displaying step of sequentially reading out the digital values of the color data for each color in a frame which are stored in the second temporary storage portion and feeding the digital values to the display portion, to display a still picture corresponding to the analog color video signal in colors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flow chart showing a detailed subroutine of processing for conversion corresponding to one line in FIG. 2;

FIG. 5 is a flow chart showing a detailed subroutine of luminance detection processing in FIG. 4;

FIG. 10 is a flow chart showing a subroutine of hue/saturation detection processing in FIG. 9.

DESCRIPTION OF THE PREFERRED EMBODIMENTS

Figure 1:
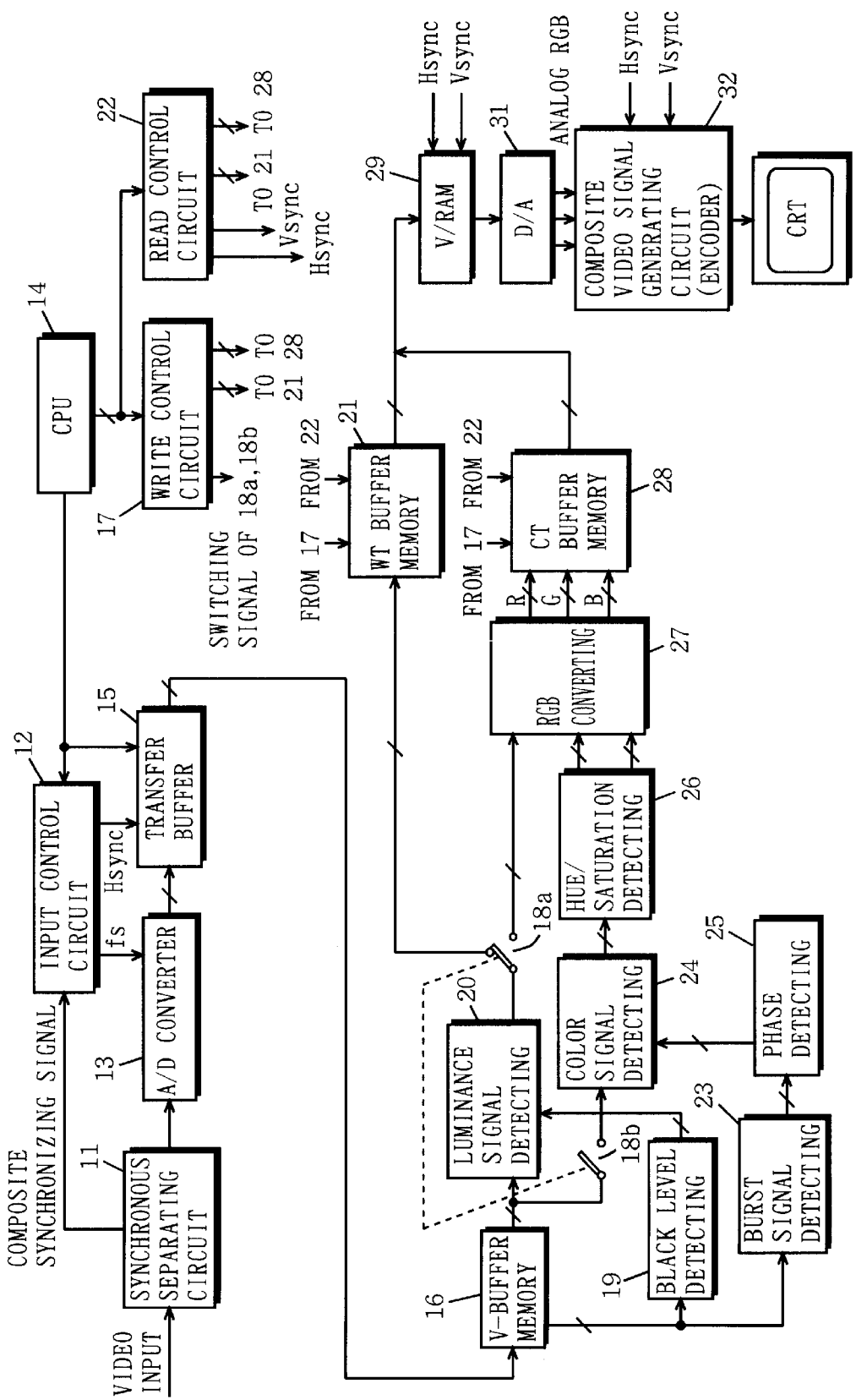
FIG. 1 is a block diagram showing the construction of a video signal digital processing device according to a first embodiment of the present invention.

FIG. 1 is a block diagram showing the construction of a video signal digital processing device according to a first embodiment of the present invention. In FIG. 1, an analog color video signal (hereinafter simply abbreviated as a "video signal") fed from a predetermined image source (a television receiver, a video camera, a video cassette recorder, etc.) is inputted to a synchronous separating circuit 11. The synchronous separating circuit 11 separates the inputted video signal into a composite synchronizing signal (a horizontal synchronizing signal and a vertical synchronizing signal) and the other signal (a color burst signal, a luminance signal, a chroma signal, etc.), and feeds the composite synchronizing signal to an input control circuit 12 and feeds the other signal to an analog-to-digital (A/D) converting circuit 13. The input control circuit 12 generates a sampling clock fs on the basis of a control signal from a CPU 14 and feeds the generated sampling clock to the A/D converting circuit 13, and generates a horizontal synchronizing signal Hsync extracted from the composite synchronizing signal. The sampling clock fs is set to a frequency which is four times that of the color burst signal (3.58 MHz), for example. The A/D converting circuit 13 subjects the video signal to analog-to-digital conversion in synchronization with the sampling clock fs, feeds the digital values of the video signal to a transfer buffer 15, and stores the fed digital values in a first-in first-out (FIFO) manner. The transfer buffer 15 has a storage capacity storing the digital values of the video signal corresponding to the number of pixels (dots) composing two lines, and reads out the digital values of the video signal in a first-in first-out manner on the basis of control carried out by the CPU 14, and feeds the digital values of the video signal to a video buffer memory (hereinafter referred to as a "V-buffer memory") 16. The V-buffer memory 16 has a storage capacity storing the digital values of the video signal corresponding to the number of pixels composing one screen, and cumulatively stores the digital values in pixel units, corresponding to one screen, which have been transferred from the transfer buffer 15, in synchronization with the sampling frequency.

In the present invention, with respect to a moving picture which is changed for each frame caused by a video signal to be inputted, an image is shown to a user in a state where the amount of data to be processed is reduced by being displayed on a color CRT display (hereinafter referred to as a "CRT") in the state of a black-and-white screen. When the user selects a desired screen by selecting an icon representing the operation of a read designating switch or the determination of reading using a mouse, image data for displaying a color screen is read, and image data corresponding to one screen is stored in a texture buffer memory for a color screen (hereinafter referred to as a "CT buffer memory") 28, described later, to accept image data relating to a still picture caused by the color screen. Therefore, a circuit in a stage succeeding the V-buffer memory 16 is constructed as follows, to perform the following operations.

Since a read instruction is not issued from the CPU 14 until the user selects a desired screen, a write control circuit 17 previously switches bus selection switches 18a and 18b upward as illustrated. In this state, the digital values of the video signal corresponding to one screen which are stored in the v-buffer memory 16 are read out in a sequential order of pixels composing one screen, and are fed to a black level detecting circuit 19 and a luminance signal detecting circuit 20. The black level detecting circuit 19 feeds a luminance level at a blanking level (a high level of a horizontal blanking signal) as a black level (a reference level) to the luminance signal detecting circuit 20. The luminance signal detecting circuit 20 finds the digital value of the luminance signal (that is, luminance data; 8 bits, for example) out of the digital values of the video signal for each pixel which have been read out from the V-buffer memory 16 on the basis of the black level, and feeds the luminance data to a texture buffer memory for a black-and-white screen (hereinafter referred to as a "WT buffer memory") 21 through the bus selection switch 18a. The WT buffer memory 21 stores the luminance data which is composed of eight bits per pixel (dot), and has a storage capacity corresponding to one screen. if display of the black-and-white screen for confirming the acceptance of an image is, for example, display of a part of a display screen of a CRT display in a size of 232 dots×192 dots (length×breadth), the WT buffer memory 21 requires a capacity of 232×192 (=44544) bytes. The WT buffer memory 21 sequentially stores the luminance data on the basis of write addresses given from the write control circuit 17, to store luminance data corresponding to one screen.

The luminance data stored in the WT buffer memory 21 is read out during a vertical blanking period on the basis of read control carried out by the read control circuit 22, and is written into a video RAM 29. The luminance data stored in the video RAM 29 is read out in synchronization with horizontal scanning of the CRT, and is then converted into an analog luminance signal by a digital-to-analog (D/A) converting circuit 31. The analog luminance signal is further converted into a composite video signal by a decoder or a composite video signal generating circuit 32, and the composite video signal is fed to the CRT. The composite video signal is displayed as a black-and-white moving picture on the CRT.

A user sees an image displayed on the CRT, and operates, when a desired image is displayed, a mouse, to select an icon for designating the determination of reading. Correspondingly, the CPU 14 feeds a read instruction to the write control circuit 17. Correspondingly, the write control circuit 17 switches the bus selection switches 18a and 18b downward by a time period required to read out the data corresponding to one frame in the V-buffer memory 16. Consequently, a black-and-white image data processing system (a WT buffer memory 21) is separated, so that a color image data processing system is activated.

In this state, the digital values of the video signal corresponding to one screen which are stored in the V-buffer memory 16 are read out in a sequential order of pixels composing one screen, and are fed to a burst signal detecting circuit 23 and a color signal detecting circuit 24. The burst signal detecting circuit 23 detects a burst signal, and feeds the detected burst signal to a phase detecting circuit 25. The phase detecting circuit 25 generates a reference phase signal on the basis of the burst signal, and feeds the generated phase signal to the color signal detecting circuit 24. The color signal detecting circuit 24 generates data representing the vector value of the chroma signal from the chroma signal fed from the V-buffer memory 16 on the basis of a phase signal corresponding to hue, and feeds the data to a hue/saturation detecting circuit 26. The hue/saturation detecting circuit 26 detects hue data and saturation data on the basis of the data representing the vector value of the chroma signal, and feeds the data to an RGB converting circuit 27. The RGB converting circuit 27 finds respective digital values (five bits) of an R signal, a G signal, and a B signal by an operation on the basis of the luminance data fed from the luminance signal detecting circuit 20, the hue data and the saturation data, and feeds respective digital data representing the R signal, the G signal, and the B signal to the CT buffer memory 28. The CT buffer memory 28 has a storage capacity storing the R data, the G data, and the B data (each composed of five bits; two bytes per pixel) corresponding to one screen per pixel. The CT buffer memory 28 stores the R data, the G data, and the B data for each of pixels composing one screen in a sequential order of write addresses fed from the write control circuit 17.

The color data R, G, and B which are stored in the CT buffer memory 28 are read out during a vertical blanking period on the basis of the read control carried out by the read control circuit 22, and are written into a video RAM 29. The color data R, G, and B which are stored in the video RAM 29 are read out in synchronization with the horizontal scanning of the CRT, are further converted into analog signals R, G, and B by the D/A converting circuit 31, and are converted into a composite video signal by the decoder or the composite video signal generating circuit 32. The composite video signal is fed to the CRT, and is displayed as a color still screen on the CRT.

At this time, it may be possible to choose, in a programmed manner, whether an accepted color image is displayed in place of a display screen for confirming an accepted image (in other words, displayed by switching the time when it is displayed in a time divisional manner), or is displayed by shifting the position where it is displayed in one screen by reducing the size of the screen (in other words, displayed on difference windows). That is, the accepted color image displayed being reduced in size and shifted may be displayed such that it is easily seen and used by a user, or displayed by being switched. The color still picture read in the CT buffer memory 28 is utilized for selecting an arbitrary size in one screen (for example, the face or the head of a person or an animal, a part of the body, etc.), cutting out color data in the selected part, synthesizing or adding the color data and the body of another person or another animal, for example.

Parts of the functions of each block described in the embodiment shown in FIG. 1 can be also realized in a software manner by program processing. The other embodiment will be described as a second embodiment.

In the second embodiment of the present invention, a synchronization separating circuit 11, an input/output control circuit 12, an A/D converter 13, and a transfer buffer 15 are respectively constituted by hard circuits as expansion equipments and are provided in relation to a CPU 14, and a V-buffer memory 16, a WT buffer memory 21, and a CT buffer memory 28 are respectively constituted by writable and readable memories (RAMs) having a large capacity. Further, the same functions as a write control circuit 17, bus selection switches 18a and 18b, a black level detecting circuit 19, a luminance signal detecting circuit 20, a read control circuit 22, a burst signal detecting circuit 23, a color signal detecting circuit 24, a phase detecting circuit 25, a hue/saturation detecting circuit 26, and an RGB converting circuit 27 are combined by a program and are achieved by the CPU 14 performing program processing of operations in flow charts shown in FIGS. 2 to 8, described later.

(Processing for Accepting a Moving Picture as Black-and-white Image Data)

Figure 2:
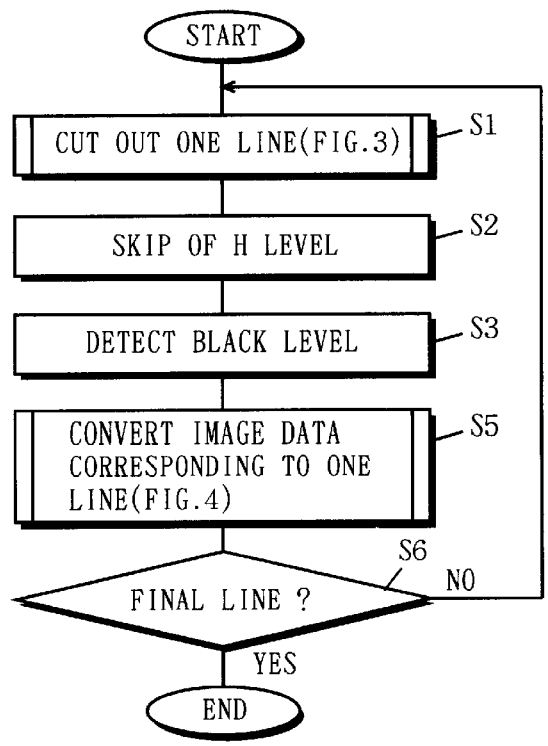
FIG. 2 is a flow chart of a main routine executed when a color video signal is accepted as black-and-white image data relating to a moving picture in a video signal digital processing device according to a second embodiment of the present invention.

FIG. 2 is a flow chart of a main routine executed on accepting a color video signal as black-and-white image data relating to a moving picture in a video signal digital processing device according to the second embodiment of the present invention. Referring now to FIG. 2, description is made of processing for writing the black-and-white image data into the WT buffer memory 21.

At the step S1, processing for cutting out a color video signal corresponding to one line and accepting the color video signal as a black-and-white video signal is first performed. The processing of cutting out the video signal corresponding to one line corresponds to the processing for writing the video signal corresponding to one line into the transfer buffer 15 in the embodiment shown in FIG. 1, and is achieved by a subroutine shown in FIG. 3, described later. At the step S2, skip processing of a horizontal synchronizing signal period ($\hat{1}$~$\hat{2}$ at the upper right of FIG. 3; hereinafter abbreviated as an "H (horizontal) level") is then performed. At the step S3, processing for detecting a luminance level at a blanking level (a high level of a horizontal blanking signal) as a black level (a reference level) is then performed. At the step S5, processing for converting image data corresponding to one line is then performed. This processing is achieved by a subroutine shown in FIG. 4, described later. At the subsequent step S6, it is judged whether or not processing corresponding to the final line of the video signal is terminated. The program is returned to the step Sl unless the processing corresponding to the final line is completed. The operations at the steps S1 to S6 are repeated until the processing that corresponding to the final line is completed.

Figure 3:
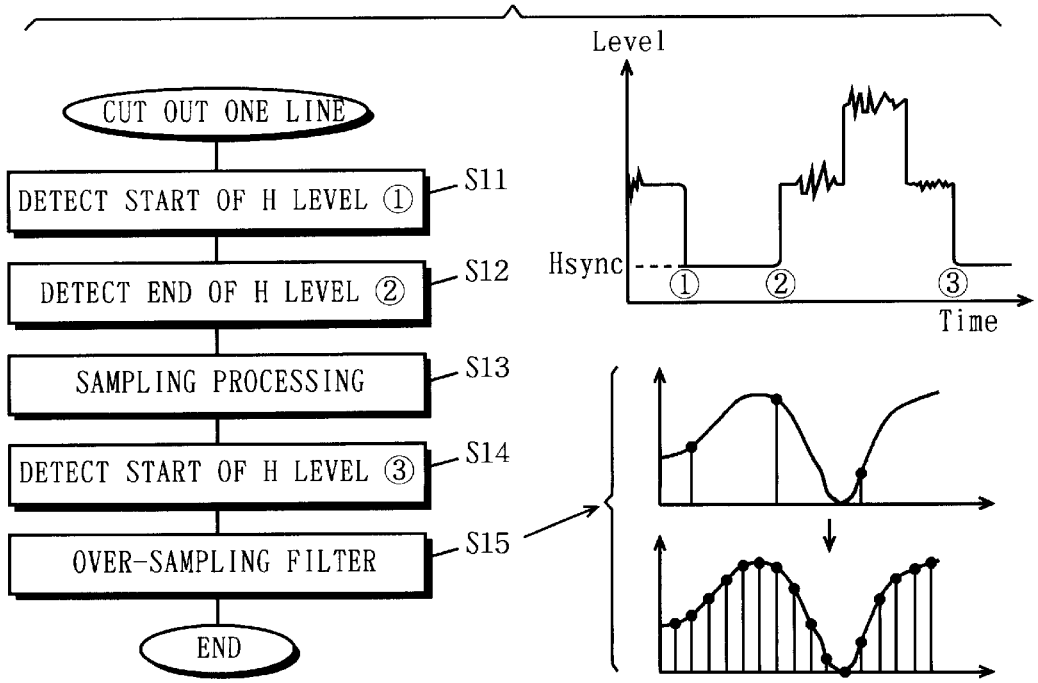
FIG. 3 is a flow chart showing a detailed subroutine of processing for cutting out one line in FIG. 2.

FIG. 3 is a flow chart of a detailed subroutine of the processing for cuttingout one line at the step S1. The processing for cutting out one line is performed as follows. At the step S11, the starting point (a portion of $\hat{1}$ in a waveform diagram shown on the right side of the flow chart) of the H (horizontal) level is first detected. At the step S12, the end point (a portion of $\hat{2}$ in the waveform diagram shown on the right side of the flow chart) of the H (horizontal) level is then detected. At the step S13, sampling processing is then performed in a predetermined period, so that a sampled black-and-white video signal is written into the transfer buffer 15. At the step S14, the starting point (a portion of $\hat{3}$ in the waveform diagram shown on the right side of the flow chart) of the subsequent H (horizontal) level is then detected. At the subsequent step S15, over-sampling filter processing (in other words, processing for performing interpolation such that sampling intervals shown in the upper stage of a waveform diagram on the right side of the step S15 shown in FIG. 3 become sampling intervals shown in the lower stage thereof). Thereafter, the program is returned to the step S2 in the main routine.

FIG. 4 is a flow chart showing a detailed subroutine of the processing for conversion corresponding to one line at the step S5. The processing for conversion corresponding to one line is performed in the following procedure. That is, at the step S21, processing for accepting (reading) samples of a video signal corresponding to one dot in the horizontal direction which is obtained by analog-to-digital conversion is performed. At the step S22, processing for detecting luminance is then performed. The luminance detection processing is achieved by executing a subroutine shown in FIG. 5. At the step S25, it is then judged whether or not processing corresponding to one line is terminated. When the processing corresponding to one line is not terminated, the steps S21, 22, and 25 are repeated. When the processing corresponding to one line is terminated, the program is returned to the step S6 in the main routine.

FIG. 5 is a flow chart showing a detailed subroutine of the luminance detection processing at the step S22. The luminance detection processing is performed in the following procedure. That is, at the step S31, the average value P of the luminance levels of dot samples is found. At the step S32, processing for subtracting a black level b from the average value P of the luminance levels (P−b=A) is then performed. At the step S33, scaling processing of a reference luminance level (B) (that is, operation processing of A÷B) is then performed, so that processing for detecting a chroma/luminance signal is performed.

Thereafter, the program proceeds to the step S25 shown in FIG. 4.

By performing the foregoing processing in one frame period, luminance data corresponding to one screen is written into storage area of the WT buffer memory 21 which are specified by addresses corresponding to dot positions on a display screen. Read control is carried out by hard circuits in the same manner as the operations described in FIG. 1.

In this state, a black-and-white moving picture is displayed on the CRT. However, a user operates, when the user sees a desired image to be accepted, an input equipment such as a keyboard, a mouse, or a controller for a game machine, to issue an instruction to accept the image. Correspondingly, processing for writing color image data into the CT buffer memory 28 is performed as follows.

(Processing for Accepting a Still Picture Corresponding to One Screen as Color Image Data)

Figure 6:
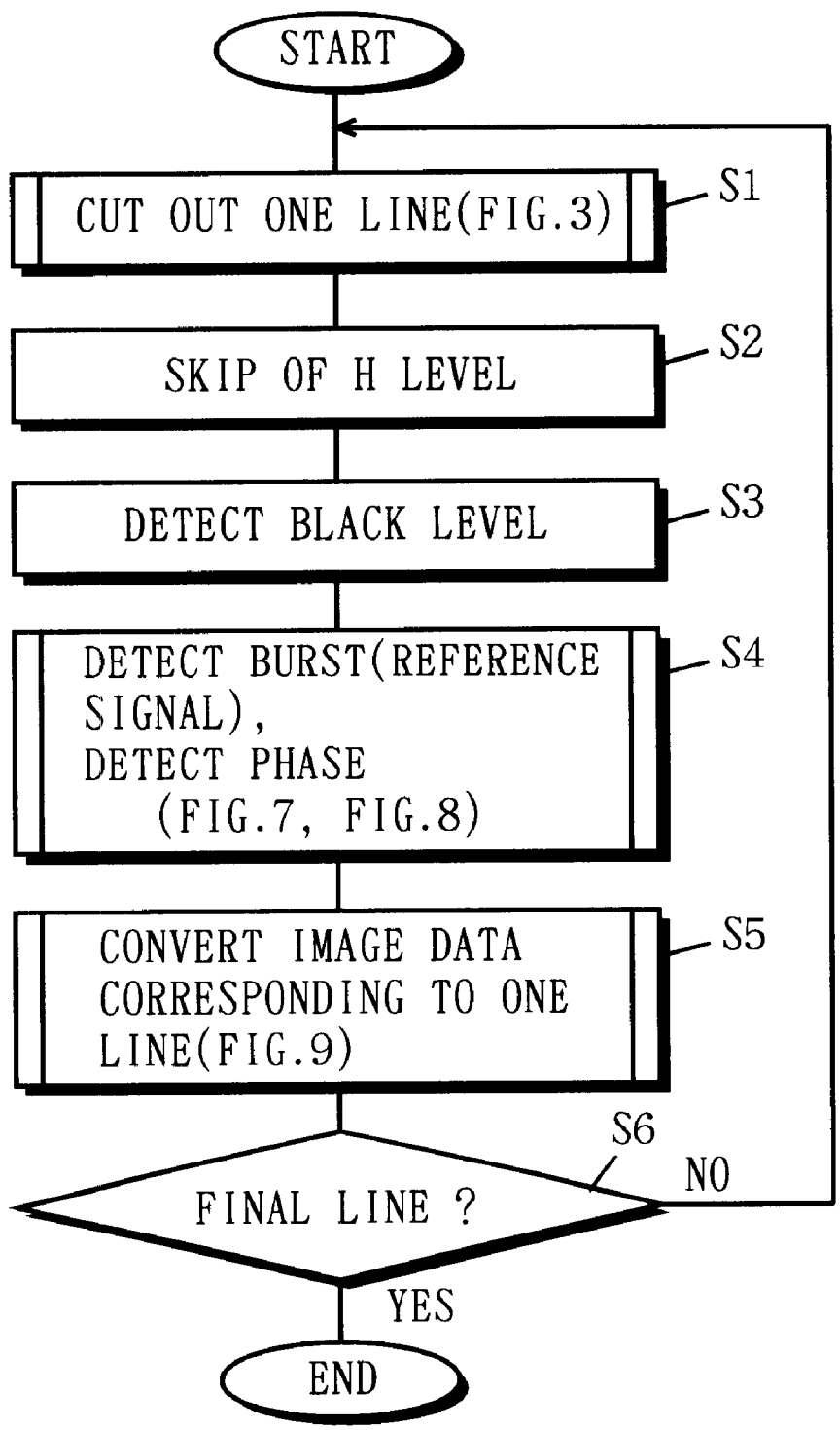
FIG. 6 is a flow chart showing a main routine executed when a color video signal is accepted as color image data relating to a still picture corresponding to one screen in a video signal digital processing device according to a second embodiment of the present invention.

FIG. 6 is a flow chart of a main routine executed on accepting a color video signal as color image data relating to a still picture corresponding to one screen in the video signal digital processing device according to the second embodiment of the present invention. Referring now to FIG. 6, description is made of processing for accepting the color video signal, that is, processing for writing the color image data into the CT buffer memory 28.

Figure 7:
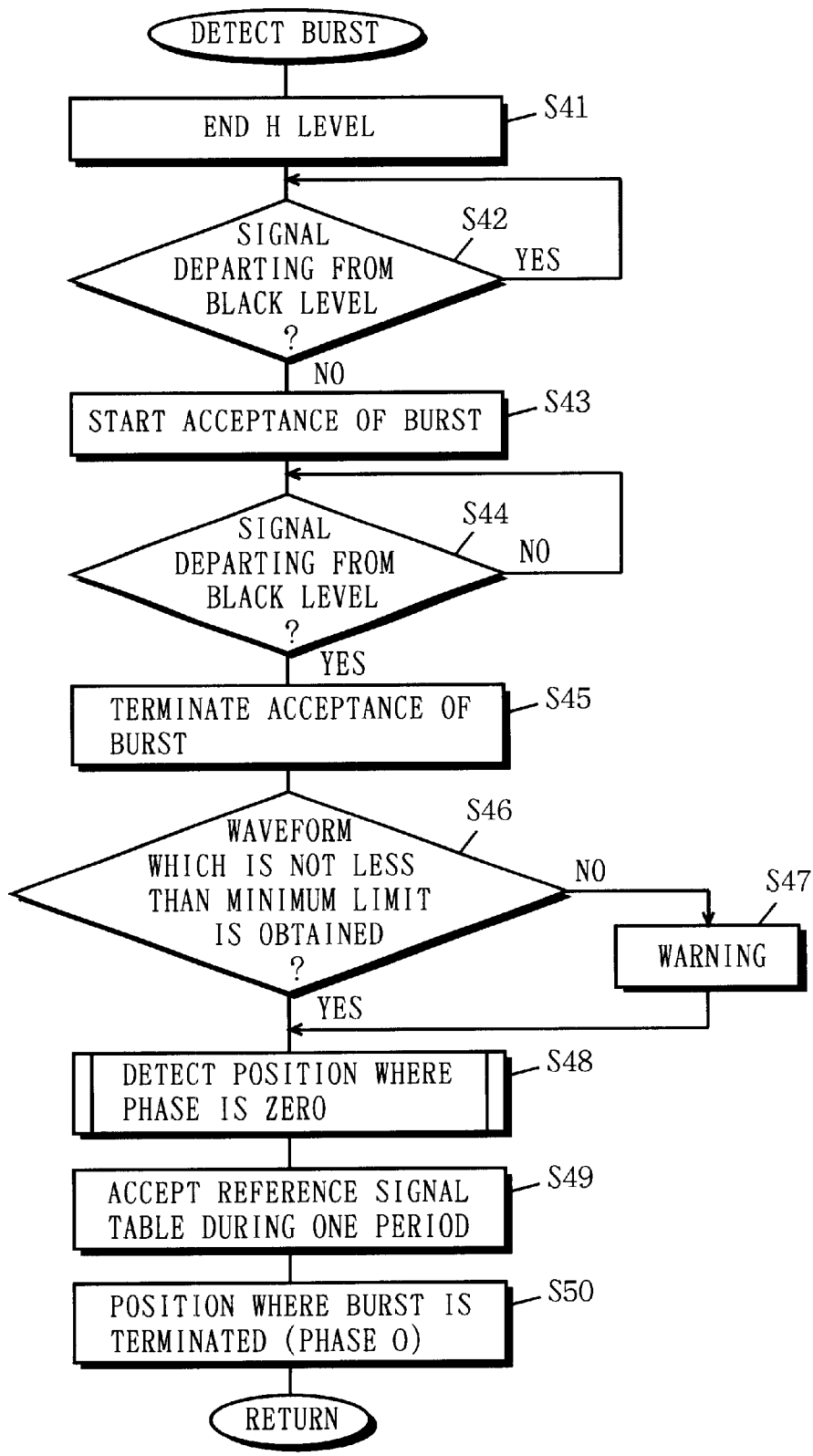
FIG. 7 is a flow chart showing a subroutine of reference burst signal detection processing in FIG. 6.
Figure 8:
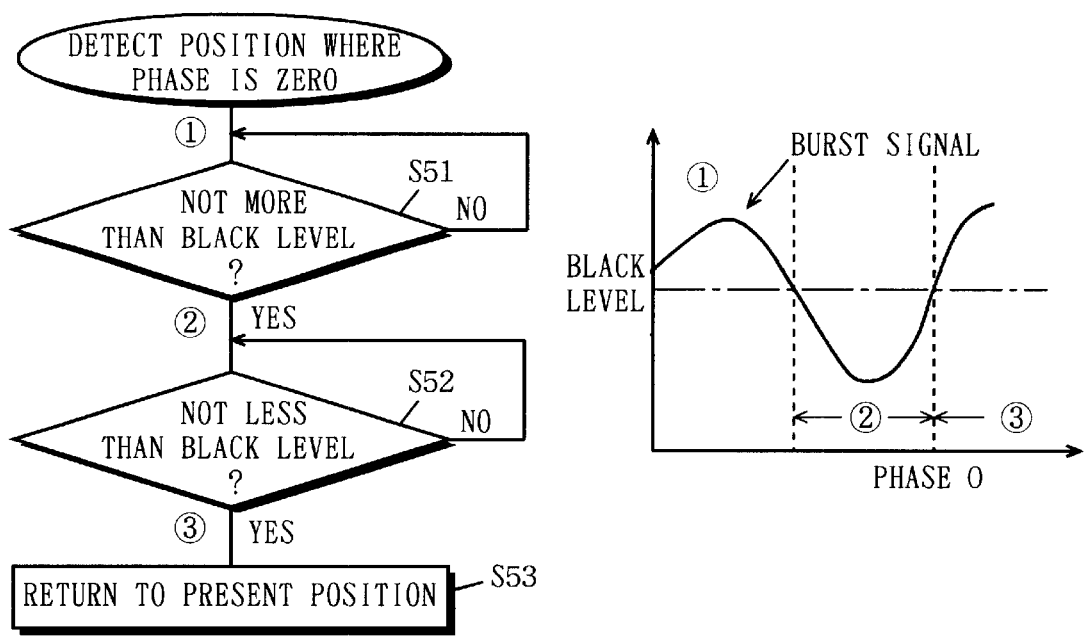
FIG. 8 is a flow chart showing a subroutine of phase zero detection processing in FIG. 7.
Figure 9:
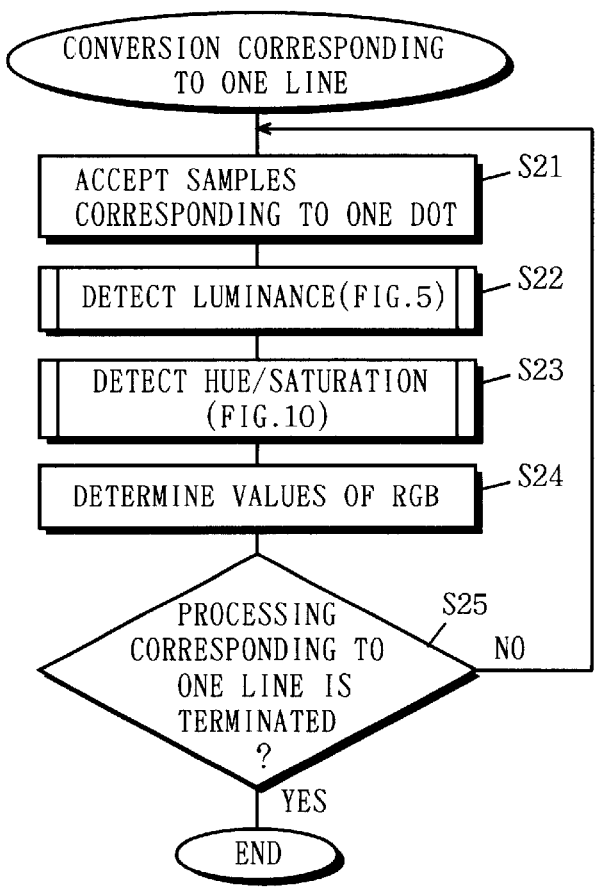
FIG. 9 is a flow chart showing a detailed subroutine of processing for conversion corresponding to one line in FIG. 6.
Figure 11:
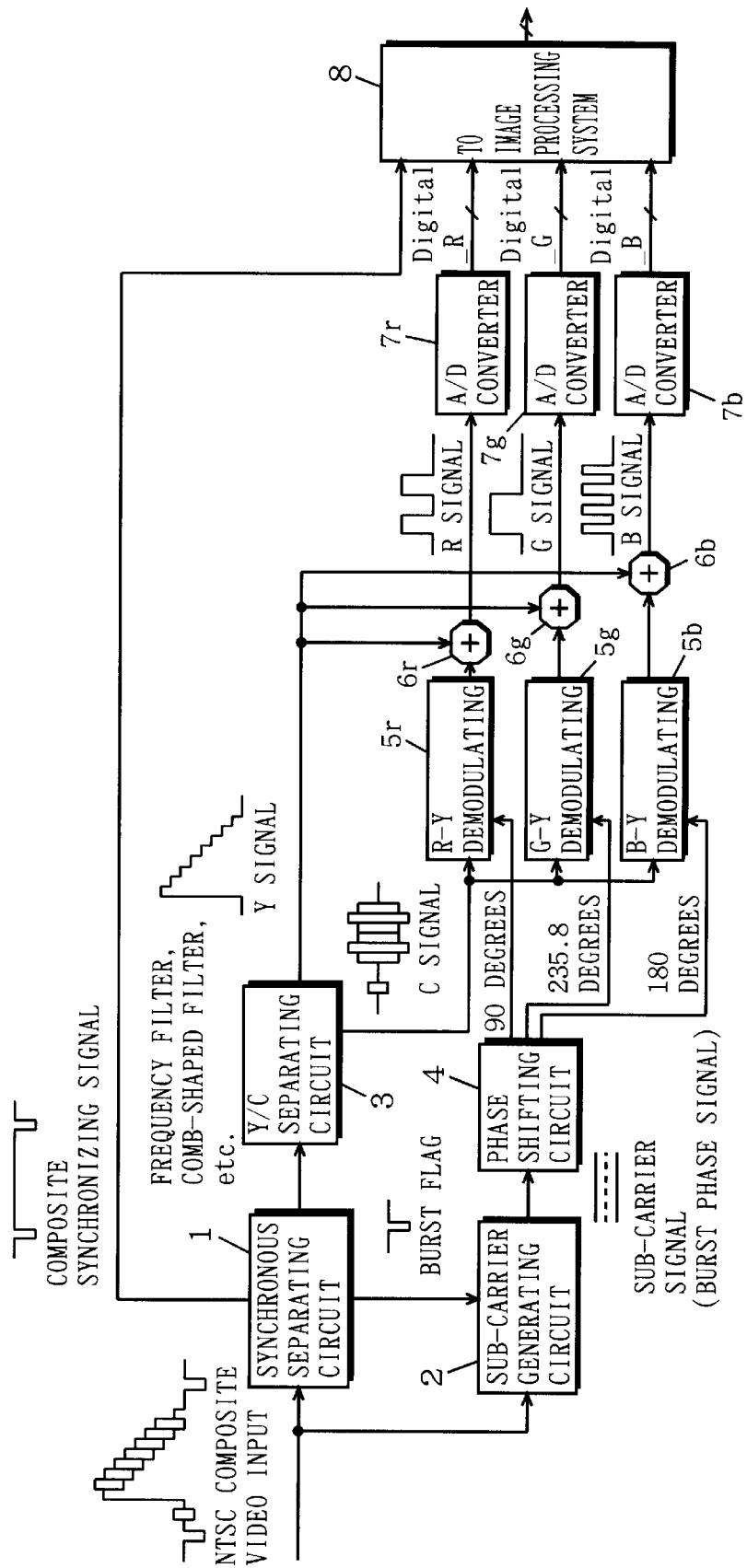
FIG. 11 is a block diagram showing the construction of a conventional color video signal digital processing device.

As the color video signal acceptance processing, processing in a burst detection subroutine shown in FIG. 7 and processing in a phase zero detection subroutine shown in FIG. 8 are performed as burst detection processing at the step S4 shown in FIG. 6, processing in one line conversion subroutine shown in FIG. 9 is performed as one line conversion processing at the step S5 shown in FIG. 6, and processing in a subroutine shown in FIG. 10 is performed as hue/saturation detection processing at the step S23 shown in FIG. 9.

Specifically, at the step S1 shown in FIG. 6, a color video signal corresponding to one line is cut out. Processing for cutting out the video signal corresponding to one line is achieved by the subroutine shown in FIG. 3, which is the same as that in the case of the black-and-white video signal. At the step S2, skip processing of an H (horizontal) level is then performed. At the step S3, processing for detecting a black level is performed. Processing at the steps S2 and S3 is the same as that in the case of the black-and-white video signal. At the step S4, processing for detecting a burst signal is then performed. Specifically, processing shown in FIGS. 7 and 8 is performed.

Referring to FIG. 7, description of a subroutine of reference burst signal detection processing. At the step S41, the end point of the H (horizontal) level is detected. At the step S42, it is then judged whether or not a reference burst signal is a signal departing from the black level. If the reference burst signal is the signal departing from the black level, the program waits until a signal that does not depart from the black level arrives. If the signal that does not depart from the black level arrives, the program then proceeds to the step S43. At the step S43, the acceptance of the burst signal is started. At the step S44, it is then judged whether or not the burst signal is the signal departing from the black level. If the burst signal is not the signal departing from the black level, the program waits until a signal departing from the black level arrives. When the signal departing from the black level arrives, the program proceeds to the step S45. At the step S45, the acceptance of the burst signal is terminated. Consequently, the burst signal is accepted during a burst signal period. It is then judged at the step S46 whether or not a waveform that is not less than the minimum limit is obtained. When the waveform is not obtained, a warning is provided at the following step S47. When the waveform is obtained, the position where the phase is zero is detected at the foregoing step S48.

As to the detection of the position where the phase is zero, it is judged at the step S51 whether or not the level of the burst signal is not more than the black level, as shown in FIG. 8. If the level is not less than the black level, the program waits until the level is not more than the black level. When the level is not more than the black level, the program proceeds to the following step S52. At the step S52, it is judged whether or not the level is not less than the black level. If the level is not more than the black level, the program waits until the level is not less than the black level. When the level is not less than the black level, it is judged that the phase is zero. At the step S53, the burst signal is returned to the present position. Thereafter, at the step S49, a reference signal table is accepted during one period. At the subsequent step S50, the position where the burst signal is terminated, that is, the phase is zero is detected, after which the program is returned to the step S5 in the main routine. At the step S5, the processing for conversion corresponding to one line, and specifically processing in a subroutine shown in FIG. 9 is performed.

The one line conversion processing is performed in the procedure in the subroutine shown in FIG. 9. At the step S21, the acceptance (reading) of samples of a video signal corresponding to one dot in the horizontal direction, which is obtained by analog-to-digital conversion, is performed. At the step S22, processing for detecting luminance is then performed. The luminance detection processing is achieved by executing the subroutine shown in FIG. 5. Processing for detecting hue/saturation at the following step S23 is performed by executing a subroutine shown in FIG. 10.

Specifically, at the step S61 shown in FIG. 10, hue is detected on the basis of the angle of a color vector. At the step S62, saturation is then detected by calculating the length of the color vector ($\sqrt{(a2+b2)}$). At the step S63, processing for normalizing the color vector is then performed. At the step S64, the saturation is then finely adjusted, after which the program is returned to the step S24. At the step S24, respective digital values of an R signal, a G signal, and a B signal are determined on the basis of respective data representing hue, saturation, and luminance. At the step S25, it is then judged whether or not processing corresponding to one line is terminated. When the processing corresponding to one line is not terminated, the operations at the steps S21 to S25 are repeated. When the processing corresponding to one line is terminated, the program is returned to the step S6 in the main routine. At the step S6, it is judged whether or not processing to the final line of the video signal is terminated. If the processing corresponding to the final line is not completed, the program is returned to the step S1. The operations at the steps S1 to S6 are repeated until the processing that corresponding to the final line is completed.

By the foregoing processing, the color image data relating to the still picture corresponding to one frame is written into the CT buffer memory 28. Operations in a case where data stored in the CT buffer memory 28 is read out, to display a color still picture are similarly performed by the hard circuits in the embodiment shown in FIG. 1.

By performing the above-mentioned processing in the flow charts shown in FIGS. 2 to 10, the functions of the hard circuits in the embodiment shown in FIG. 1 are also realized by program processing. When the functions are realized by software processing, a color video signal is accepted as a black-and-white video signal and is written as black-and-white image data into the WT buffer memory 21 in the case of a moving picture, so that the amount of processing of the data can be made smaller, the processing can be realized by a smaller number of processing steps, and the processing efficiency is made higher, thereby making it possible to reduce the burden on the CPU, as compared with a case where the color video signal is accepted as a color moving picture.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal digital processing device for digitally processing an analog color video signal and feeding the digitally processed analog color video signal to display means, comprising:

analog-to-digital conversion means for converting said analog color video signal into a digital video signal;

first temporary storage means for storing digital values of a luminance signal corresponding to a plurality of pixels composing one screen;

second temporary storage means for storing digital values of color data representing three primary colors corresponding to the plurality of pixels composing one screen;

luminance data extraction means for extracting the digital values of the luminance signal from said digital video signal while said analog color video signal is a signal for a moving picture which is changed for each frame;

read timing designation means for designating timing at which the color data should be read from said digital video signal;

color data extraction means for extracting for each color the digital values of the color data representing the three primary colors from said digital video signal at the timing designated by said read timing designation means;

write control means for writing in a sequential order of frame scanning the digital values of the luminance signal for each frame which have been extracted by said luminance data extraction means into said first temporary storage means until the read timing is designated by said read timing designation means, and writing the digital values of the color data which have been extracted for each color by said color data extraction means into said second temporary storage means when the read timing is designated by the read timing designation means; and read control means for sequentially reading out the digital values of the luminance signal for each frame which are stored in said first temporary storage means and feeding the digital values to said display means, to display the moving picture corresponding to said analog color video signal in black and white, and sequentially reading out the digital values of the color data for each color in a frame which are stored in said second temporary storage means and feeding the digital values to the display means, to display a still picture corresponding to the frame of said analog color video signal in colors.

2. The video signal digital processing device according to claim 1, further comprising an input buffer memory for temporarily storing the digital values of said digital video signal, wherein said luminance data extraction means extracts the digital values of the luminance signal out of the digital values stored in said input buffer memory, and said color data extraction means extracts for each color the digital values of the color data representing the three primary colors out of the digital values stored in said input buffer memory.

3. The video signal digital processing device according to claim 1, wherein said read control means sequentially reads out the digital values of the luminance signal for each frame which are stored in said first temporary storage means to display the moving picture in black and white on a part of a display screen of said display means, and sequentially reads out the digital values of the color data for each color in a frame which are stored in said second temporary storage means to display the still picture in colors on the other part of the display screen of the display means.

4. The video signal digital processing device according to claim 1, wherein said read control means performs in a time divisional manner a first read controlling operation for sequentially reading out the digital values of the luminance signal for each frame which are stored in said first temporary storage means to display the moving picture in black and white on said display means and a second read controlling operation for sequentially reading out the digital values of the color data for each color in a frame which are stored in said second temporary storage means to display the still picture in colors on said display means.

5. An information storage medium for video signal digital processing, which is applied to a video signal digital processing device comprising analog-to-digital conversion means for converting an analog color video signal into a digital video signal, first temporary storage means for storing digital values of a luminance signal corresponding to a plurality of pixels composing one screen, second temporary storage means for storing digital values of color data representing three primary colors corresponding to the plurality of pixels composing one screen, and information processing means and for digitally processing the color video signal and feeding the digitally processed color video signal to display means, said information storage medium storing a program executed by said information processing means, wherein said program comprises:

a luminance data extraction program for extracting the digital values of the luminance signal from said digital video signal while said analog color video signal is a moving picture which is changed for each frame;

a read timing designation program for designating timing at which the color data should be read from said digital video signal;

a color data extraction program for extracting for each color the digital values of the color data representing the three primary colors from said digital video signal at the read timing designated by said read timing designation program;

a first write program for writing in a sequential order of frame scanning the digital values of the luminance signal for each frame which have been extracted by processing based on said luminance data extraction program into said first temporary storage means until the reading of the color data is designated by said read timing designation program;

a second write program for writing the digital values of the color data which have been extracted for each color by processing based on said color data extraction program into said second temporary storage means when the read timing is designated by said read timing designation program;

a first read program for sequentially reading out the digital values of the luminance signal for each frame which are stored in said first temporary storage means and feeding the digital values to said display means, to display the moving picture corresponding to said analog color video signal in black and white; and a second read program for sequentially reading out the digital values of the color data for each color in a frame which are stored in said second temporary storage means and feeding the digital values to said display means, to display a still picture corresponding to said analog color video signal in colors.

6. A video signal digital processing method of digitally processing a color video signal and feeding the digitally processed color video signal to display means to display the color video signal thereon in a video signal digital processing device comprising analog-to-digital conversion means for converting an analog color video signal into a digital video signal, first temporary storage means for storing digital values of luminance signals corresponding to a plurality of pixels composing one screen, second temporary storage means for storing digital values of color data representing three primary colors corresponding to the plurality of pixels composing one screen, and comprising:

the conversion step of converting the analog color video signal into a digital video signal by said analog-to-digital conversion means;

the luminance-signal-extraction step of extracting the digital values of the luminance signals from said digital video signal obtained by the conversion at the conversion step while said analog color video signal is a moving picture which is changed for each frame;

the timing-designation step of designating timing at which the color data should be read from said digital video signal;

the color-data-extraction step of extracting for each color the digital values of the color data representing the three primary colors from said digital video signal at the timing designated at said timing-designation step;

the luminance-signal-writing step of writing in a sequential order of frame scanning the digital values of the luminance signals for each frame which have been extracted at said luminance-signal-extraction step into said first temporary storage means until the reading of the color data is designated at said timing-designation step;

the color-data-writing step of writing the digital values of the color data which have been extracted for each color at said color-data-extraction step into said second temporary storage means when the read timing is designated at said timing-designation step;

the moving-picture-displaying step of sequentially reading out the digital values of the luminance signals for each frame which are stored in said first temporary storage means and feeding the digital values to said display means, to display the moving picture corresponding to said analog color video signal in black and white; and the still-picture-displaying step of sequentially reading out the digital values of the color data for each color in a frame which are stored in said second temporary storage means and feeding the digital values to said display means, to display a still picture corresponding to said analog color video signal in colors.

* * * * *